No. 862,416. PATENTED AUG. 6, 1907.
C. F. SKOOG.
PAN LIFTER.
APPLICATION FILED MAR. 18, 1907.
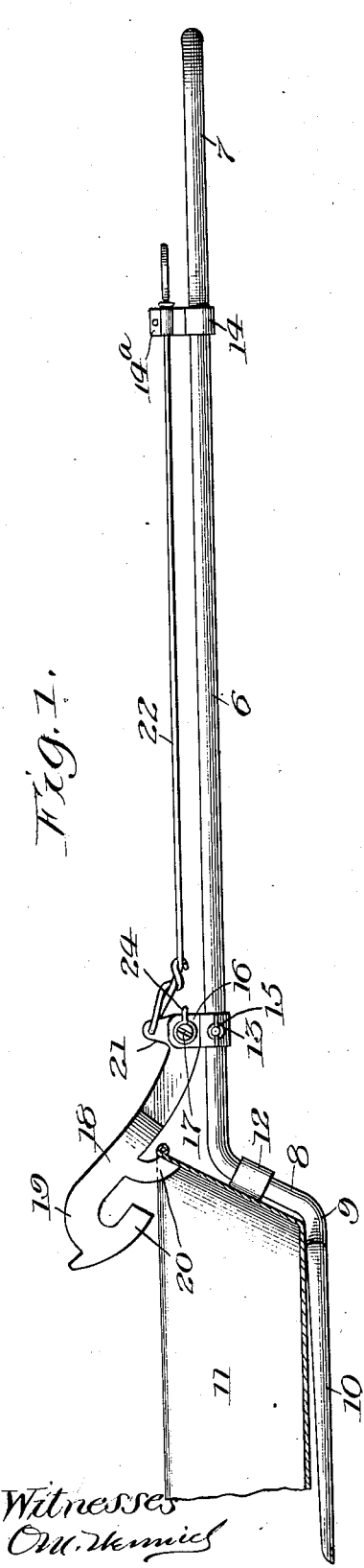
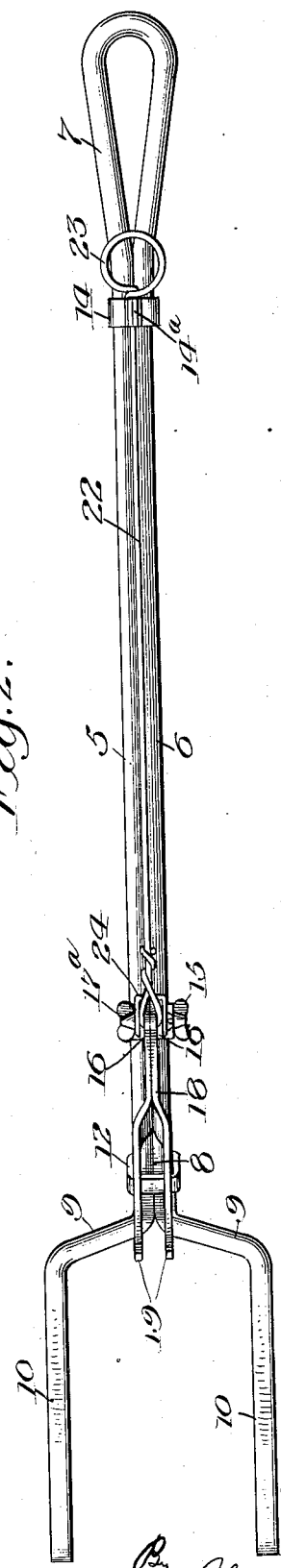
Inventor
Carl F. Skoog
By Chas. C. Tillman Atty
Witnesses

UNITED STATES PATENT OFFICE.

CARL F. SKOOG, OF CHICAGO, ILLINOIS.

PAN-LIFTER.

No. 862,416.  Specification of Letters Patent.  Patented Aug. 6, 1907.

Application filed March 18, 1907. Serial No. 362,917.

*To all whom it may concern:*

Be it known that I, CARL F. SKOOG, a citizen of the United States, residing at Chicago, in the county of Cook and State of Illinois, have invented certain new and useful Improvements in a Pan-Lifter, of which the following is a specification.

This invention relates to improvements in an implement to be used for lifting or removing culinary vessels, such as baking pans and the like, and while it is more especially intended for use in removing such pans, while hot, from ovens, yet it is capable of use for lifting or removing other vessels; and it consists in certain peculiarities of the construction, novel arrangement, and operation of the various parts thereof, as will be hereinafter more fully set forth and specifically claimed.

The object of the invention is to provide a lifting device for pans and the like, which shall be simple and inexpensive in construction, strong, durable and efficient in operation, and so made that its parts are adapted to engage pans or vessels of different sizes, so that they may be readily lifted or removed, while hot, without injury to the hands of the person handling them.

A further object of the invention is to so construct the device that the engagement of the pivoted catch or dog with the pan or vessel will be automatically performed, when the prongs of the lifter are inserted under the pan or vessel.

Other objects and advantages of the invention will be disclosed in the subjoined description and explanation.

In order to enable others skilled in the art to which my invention pertains, to make and use the same, I will now proceed to describe it, referring to the accompanying drawing, in which—

Figure 1 is a view in side elevation of a pan lifter embodying the invention, showing it in engagement with a portion of a pan, which is illustrated in section; and Fig. 2 is a plan view of the lifter.

Like numerals of reference, refer to corresponding parts throughout the different views of the drawing.

The body of the lifter is preferably formed of a single piece rod or wire, bent to form parallel members 5 and 6, united at one of their ends by means of a loop 7 which forms the handle portion of the body, and also means for hanging the device up. The members 5 and 6, near their ends opposite the looped handle 7, are downwardly deflected as at 8, and are then bent outwardly and from each other as at 9, so as to lie in substantially a horizontal plane, when the device is being used to lift the pan or vessel. The laterally extended portions 9 of the members 5 and 6 are extended forwardly, in parallelism, to form prongs 10, which are spaced at a considerable distance apart, and each has the upper portion of its free end beveled or rounded, as shown, so as to be easily inserted under the bottom of the pan 11 without injury thereto. The members 5 and 6, comprising the body of the lifter, are firmly secured together by means of clasps or bands 12, 13 and 14, which surround said members, as shown.

The band 12 is located on the downturned portions 8 of the members 5 and 6, while the clasp or band 13 is located on said members near the downturned portions 8 thereof. The clasp 13 is provided with a set-screw 15 to engage one of the members of the body of the lifter, so that said clasp or band may be adjusted at a suitable point thereon. This clasp is provided on its upper portion with two spaced apart and upwardly extending lugs 16, between which is pivotally secured, by means of a screw or rivet 17, one end of a catch or dog 18, which is formed at its upper portion with spaced apart prongs 19, each of which carries on its lower surface downwardly extending lugs or projections 20, which are rounded or inclined rearwardly on their lower surfaces, so that when the prongs 10 of the lifter are forced under the pan the upper edge of the latter will strike against the rounded or inclined portions of the projections 20, thus causing the dog or catch 18 to be lifted until the projections pass over the upper edge of the pan, when the free ends of said projections will engage the inner surface of the upwardly extended wall of the pan, when, by reason of the weight of the dog or catch 18, one pair of the projections 20 will be firmly held in contact with the wall of the pan, so that it, the pan, may be lifted or removed with safety, or without danger of being upset. The lower or pivoted portion of the dog or catch 18 is provided with an upwardly extending apertured projection 21, in which is fastened a wire or rod 22, which is extended above the members 5 and 6 and in parallelism therewith rearwardly to near the looped handle 7, and has its rear end formed with an eye or ring 23, in which one of the fingers of the operator may be inserted, when it is desired to disengage the dog or catch 18 from the pan. The rear portion of the releasing rod 22 is movably mounted between two upwardly extending projections 14$^a$ on the clasp 14, as will be readily understood by reference to the drawing.

In order to regulate the movements of the dog or catch 18—that is—so that it may move freely or less so between the lugs 16 of the clasp 13, the pivot screw 17 may be provided at one of its ends with a nut 17$^a$, which can be tightened or loosened thereon, as desired.

The operation of the device is simple and as follows:—When it is desired to remove a hot or other pan from the oven or other place, the prongs 10 of the lifter are forced under the bottom of the pan, in which operation the lower pair of projections 20 on the catch 18, if the pan is of the ordinary height, will strike against the rim of the pan with their front or inclined surfaces, when by a further forward movement of the lifter, the said prongs will pass over the rim and engage the upper portion of the wall of the pan, as shown in Fig. 1 of the drawing. After the pan is removed, the projections 20 of the catch 18 may be released by simply raising the handled portion of the lifter, or the catch may be raised by means of the releasing rod 22, as is apparent. If the pan or vessel is an unusually high one, the upper pair of projections 20 on the catch 18 will operate in the same manner as the lower pair just above described, and the operation of releasing the lifter from the pan may be performed in the same manner as just above described. Secured at its ends near each end of the pivot 17 is a yoke 24, which is adapted to check the rearward movement of the catch 18, for it is apparent that the lug or projection 21 on said catch, when the latter is raised, will strike the yoke 24 and prevent the catch passing a vertical line, thus causing it to fall back so as to be in engagement with the pan, when desired.

Having thus fully described my invention, what I claim as new, and desire to secure by Letters-Patent, is—

A pan lifter consisting of a body portion formed of a single piece and bent to provide parallel members having at one of their ends a looped handle and near their other ends downturned and outwardly extended portions each provided with a forwardly extending prong, bands or clasps mounted on the parallel members of the body portion to secure the same together, means on one said of clasps to adjustably secure it on the body portion a two-pronged catch or dog pivotally mounted at one of its ends on the adjustable one of said clasps and having on its lower surface downwardly extended and rearwardly inclined projections arranged in pairs to engage the upper portion of the pan, and a releasing rod movably mounted on the other of the clasps and connected at one of its ends to said catch.

CARL F. SKOOG.

Witnesses:
CHAS. C. TILLMAN,
M. A. NYMAN.